United States Patent Office 2,773,922
Patented Dec. 11, 1956

2,773,922

RUBBER HYDROCHLORIDE PRODUCTS AND METHOD OF MAKING SAME

Gerrit Schuur, The Hague, Netherlands, assignor to Rubber-Stichting, Delft, Netherlands, a corporation of the Netherlands No Drawing. Application October 10, 1951,
Serial No. 250,790

Claims priority, application Netherlands
November 20, 1950

7 Claims. (Cl. 260—735)

This invention relates to the preparation of organosols of rubber hydrochloride, which are capable of being gelatinized.

It is an object of this invention to provide a process of preparation of these organosols.

It is a further object of the invention to provide a method of manufacturing with the aid of the said rubber hydrochloride organosols, thin walled articles and more especially thin sheet material.

It is also an object of this invention to provide a sheet material substantially consisting of a gelatinized organosol of rubber hydrochloride.

As is well known to persons skilled in the art, an organosol is a dispersion of a substance, in which the dispersing agent is an organic liquid. A dispersion consists of a continuous phase, which is the dispersing agent, and a discontinuous phase which is the dispersed phase and which consists of small individual particles. A dispersion, consequently, is stable only if the swelling of the dispersed phase in the dispersing agent remains only slight. If it becomes excessive, the dispersed particles will not remain separate from one another, but will display a tendency for cohesion and the dispersion will then cease to exist as such. In other words, the dispersion will turn into a jelly, it will become gelatinized.

The speed and extent of the swelling is dependent on the temperature. It will increase as the temperature rises.

According to this invention, now, it is possible to prepare dispersions at a temperature at which the swelling effect is only slight, and to cause this dispersion to gelatinize by raising the temperature.

In applying this method to rubber hydrochloride to be dispersed in an organic liquid, the rubber hydrochloride should preferably be in a state of fine subdivision. It is possible to prepare such finely divided rubber hydrochloride for instance by the hydrochlorination of latex, as described in the specification of U. S. patent to O. J. van Veersen No. 2,596,878. The rubber hydrochloride obtained according to van Veersen's patent is soluble only with difficulty in the solvents usually employed in this art such as benzene, carbon tetrachloride and the like and can be dispersed easily in an organic liquid and the formation of such dispersion can be obtained for instance in a ball mill. Such rubber hydrochloride, as disclosed in said patent, is prepared by the hydrochlorination of an aqueous dispersion of natural rubber and possesses high molecular weight, low solubility, and high chlorine content.

There exist organic liquids which do not dissolve rubber hydrochloride even at a temperature above normal and which have only a negligible swelling effect on rubber hydrochloride. Such liquids are for instance benzine, gasoline, methanol, ethanol and acetone. They may be used in preparing in a simple manner organosols of rubber hydrochloride at room temperature, but the organosols thus prepared cannot be gelatinized by raising the temperature. After prolonged heating the dispersion agent eventually will evaporate and the rubber hydrochloride particles will remain over practically without showing any tendency for cohesion. It is evident that these liquids are not suitable for the purposes of this invention.

Most other organic liquids will cause only a slight swelling of rubber hydrochloride at room temperature. At higher temperatures such as 80° C. or above they display a stronger swelling effect and may even dissolve the rubber hydrochloride. Examples of such liquids are the liquid aromatic hydrocarbons and monochlorinated hydrocarbons, for instance benzene, toluene, xylene, and monochlorobenzene. There are other liquids showing the same properties, amongst them dioxane, amylacetate, tetrahydrofuran, 1-2 dichloroethane and mesityloxide.

Since dispersion can take place at room temperature and preferably between 10 and 40° C., it is easy to prepare organosols of rubber hydrochloride. If these organosols are heated, for instance above 80° C., they become gelatinized. After prolonged heating the dispersing agent will evaporate and a coherent mass of rubber hydrochloride will remain over. Accordingly, liquids of the type indicated are preferable for use in the process of this invention.

The swelling effect of some organic liquids on rubber hydrochloride is so pronounced even at or near room temperature that the preparation of an organosol of rubber hydrochloride must be carried out at lower than room temperature. In that case cooling must be resorted to during the dispersion. Owing to this complication, liquids of this type, as a rule, although they can be used on principle, are of lesser interest for the purposes of this invention. In some cases, however, the fact that organosols of rubber hydrochloride prepared with these liquids, gelatinize already at relatively low temperature, may even be advantageous. Examples of these liquids are chloroform, tetrachlorethane, methylene dichloride and dichloroethane.

Besides individual dispersing agents, also mixtures of these liquids can be used. The addition of a small quantity of a liquid, less than about 30% by weight, of the dispersing agent, which cannot be used by itself, to a liquid or a mixture of liquids which can be used, does not impair the utility of the latter. In the preparation of the organosols it is not necessary to add an emulsifying agent.

Preferably, the organosols prepared according to the invention contain less than 40%, preferably between 5-40% by weight of rubber hydrochloride based on the total weight. Organosols with a higher rubber hydrochloride content possess a too high degree of viscosity and are of too thick a consistency as to allow a proper working up.

If it is desired to manufacture rubber hydrochloride articles from organosols which can be gelatinized, it is of course necessary to evaporate the dispersing agent. In this case no dispersing agents boiling above 150° C. should be used since with them complete evaporation would occur only at a temperature at which the rubber hydrochloride would be affected.

Dependent on the properties desired for the articles intended to be made from the organosols, plasticizing agents, stabilizing agents, dyestuffs and/or fillers may be added to the dispersion. Some of these substances will dissolve in the dispersing agent, others will not dissolve but can be dispersed in the dispersing agent.

The organosols preferably are used in the manufacture of film, either of the self supporting type or of film mounted on a base, such as paper, cardboard or textile fabric. In the latter case, the organosol is spread on a base in a thin layer, and the dispersing agent is evaporated therefrom at a temperature at which gelatinization takes place, preferably above 80° C., but not at so high a temperature that the dispersing agent might separate from the layer by boiling.

The temperature should at least be high enough to induce gelatinization, for otherwise the rubber hydrochloride particles do not form a coherent mass, and consequently no film is formed. Gelatinization proceeds more rapidly at higher temperatures, however, the temperature should not rise to a point where the dispersing agent would boil and escape from the layer, which would impart to the film an irregular structure. As a rule the temperature should not exceed 170° C.

As compared with the method hitherto followed of starting from a solution, this process offers the advantage that the starting liquid may have a considerably higher content of rubber hydrochloride. As compared with the method in which an aqueous dispersion is started from, the present process is more advantageous in that it eliminates the problem of corrosion of the apparatus, and clearer films are obtained.

Film support consisting of rubber hydrochloride can be obtained by spreading the dispersion in a thin layer on a support having a smooth surface, such as glass, metal or cellophane. After evaporation of the liquid phase the film can easily be removed from the support which, of course, may have a flat surface. When a layer of the dispersion is arranged on such a flat surface, i. e. by pouring, after removal of the support a sheet or film is obtained which may be used for wrapping or other purposes.

The dispersion may however also be molded by immersing a mould in the dispersion. In this manner many differently shaped thin walled articles may be produced.

If a base of fibrous material is selected, a covering layer is obtained after evaporation which adheres well to the base and which, even though it may be thin, offers to the base a remarkable protection against attacks by vapors and a good resistance to oils, fats and all kinds of solvents. The dispersion of course, may be used as a covering layer on material other than fibrous material.

The invention may be illustrated by the following examples wherein rubber hydrochloride was employed which was prepared by hydrochlorination of latex according to the patent of G. J. van Veersen mentioned above.

*Example 1*

100 parts by weight of rubber hydrochloride and 400 parts of monochlorobenzene were ground in a ball mill at room temperature, until a satisfactory dispersion was obtained. This dispersion was poured on a sheet of aluminum of 0.5 mm. thickness whereupon the sheet was placed for 5 minutes in a drying oven kept at a temperature of 120° C. The film could readily be removed from the sheet. It was colorless and clearly transparent.

*Example 2*

100 parts by weight of rubber hydrochloride, 40 parts gasoline and 400 parts xylene were ground and the dispersion poured on a sheet of aluminum in the same manner as according to the preceding example. After 5 minutes drying in an oven kept at a temperature of 100° C., the film could easily be removed from the sheet and was colorless and clearly transparent.

*Example 3*

100 parts by weight of rubber hydrochloride, 200 parts toluene and 200 parts monochlorobenzene, when treated as before described and dried s minutes at 150° C., yield a colorless and clearly transparent film.

*Example 4*

100 parts by weight of rubber hydrochloride and 400 parts dioxane were ground for the formation of a dispersion in a ball mill at room temperature and the dispersion was poured on a sheet of aluminum of 0.5 mm. thickness, whereupon the sheet was placed for 2 minutes in a drying oven kept at a temperature of 180° C. The film could readily be removed from the sheet. It was colorless and clearly transparent.

*Example 5*

100 parts by weight of rubber hydrochloride and 400 parts amylacetate were ground to a dispersion, the dispersion poured on a sheet of aluminum and heated 10 minutes in a drying oven to 150° C. The film showed the same properties as above described.

*Example 6*

100 parts by weight of rubber hydrochloride and 400 parts chloroform were ground to a dispersion in a ball mill at 0° C. This dispersion was poured on a sheet of aluminum of 1 mm. thickness, whereupon the sheet was placed in a tin box containing also a rag soaked in chloroform. The box was closed and placed for 3 minutes in a drying oven kept at a temperature of 50° C. The sheet was then removed from the box and placed again, this time, however, by itself, into the drying oven kept at 50° C. The film formed could then be removed from the sheet.

*Example 7*

100 parts by weight of rubber hydrochloride and 400 parts methylene dichloride were ground to a dispersion at 0° C. This dispersion was poured on a sheet of aluminum of 1 mm. thickness, whereupon the sheet was put in a tin box containing also a rag soaked in methylene dichloride. The box was closed and placed for 3 minutes, in a drying oven kept at a temperature of 60° C. The sheet was then removed from the box and placed again, however by itself, for 3 minutes into the drying oven kept at 60° C. The film formed could then be removed from the sheet.

*Example 8*

This example illustrates the use of plasticizer. 100 parts by weight of rubber hydrochloride and 400 parts monochlorobenzene were ground at room temperature as before described, whereupon 3 parts dibutyl sebacate and 3 parts dibutyl phthalate were added. The dispersion was poured on a sheet of aluminum of 0.5 mm. thickness and the sheet was placed for 5 minutes in a drying oven kept at a temperature of 130° C. The film could easily be removed from the sheet and was colorless and clearly transparent.

*Example 9*

This is another example illustrating the use of a plasticizer. 100 parts by weight of rubber hydrochloride and 400 parts benzene were ground as before described at room temperature, whereupon 4 parts dioctylphthalate were added. The dispersion was poured on a sheet of aluminum of 0.5 mm. thickness and the sheet placed 5 minutes in drying oven kept at 120° C. The film could easily be removed from the sheet. It was colorless and clearly transparent.

*Example 10*

This example illustrates the use of a stabilising agent. 2 grams stearic acid and 1 gram tri-ethanolamine were dissolved in 22 grams chlorobenzene. A dispersion of 100 parts by weight of rubber hydrochloride and 500 parts monochlorobenzene was ground in a ball mill at room temperature. 50 grams of the dispersion were then mixed with 2.5 grams of the solution of the stabilising agent. The mixture was poured on a sheet of aluminum of 0.5 mm. thickness and dried 5 minutes in a drying oven at 130° C. The film could easily be removed from the sheet. It was colorless and clearly transparent.

*Example 11*

This example illustrates the incorporation, in the film, of a dyestuff. 100 parts by weight of rubber hydrochloride, 1 part Vulcaphor Fast Blue B. S. and 500 parts monochlorobenzene were dispersed at room temperature as before described and the dispersion was poured on a sheet of aluminum of 0.5 mm. thickness, which was placed 10 minutes in a drying oven kept at 130° C. The film could easily be removed from the sheet. It was blue colored and clearly transparent. (Vulcaphor Fast Blue B. S. is the copper complex of phthalo cyanine made by Imperial Chemical Industries, Ltd.)

*Example 12*

This is another example of a film containing a dyestuff. 100 parts by weight of rubber hydrochloride, 1 part Vulcaphor Fast Blue B. S. and 400 parts xylene were dispersed at room temperature as before and the dispersion poured on a sheet of aluminum of 0.5 mm. thickness, which was placed 5 minutes in a drying oven kept at 120° C. The blue colored clearly transparent film could easily be removed from the sheet.

*Example 13*

This is an example of a film containing a filler. 100 parts by weight of rubber hydrochloride, 10 parts Silene EF and 400 parts chlorobenzene were dispersed as before described at room temperature and the dispersion was poured on a sheet of aluminum of 0.5 mm. thickness, which was dried 5 minutes in an oven at 130° C. The film was of white color and opaque. It could easily be removed from the sheet. (Silene EF is a finely divided calcium silicate.)

*Example 14*

100 parts by weight of rubber hydrochloride, 10 parts Silene EF, 3 parts calcium stearate, 3 parts magnesium dioxide and 400 parts monochlorobenzene were ground to a dispersion at room temperature. A glass tube was immersed in the dispersion and then placed 5 minutes in a drying oven kept at 130° C. In this way a white, opaque coating or sleeve was formed on the tube.

*Example 15*

On repeating the operations described with reference to Example 14, however heating the glass tube to 150° C. before immersing it in the dispersion, the sleeve obtained had a greater wall thickness.

*Example 16*

100 parts by weight of rubber hydrochloride and 233 parts xylene were ground at room temperature and the dispersion spread on paper and placed 10 minutes in a drying oven kept at 130° C. The coating adhered well to the paper.

*Example 17*

100 parts by weight of rubber hydrochloride and 300 parts of monochlorobenzene were ground at room temperature and the dispersion spread on paper and placed 10 minutes in a drying oven kept at 130° C. The result was the same as in the preceding example.

Various changes within the scope of the appended claims may be made in the process, operating conditions and materials above described without departing from the spirit of the invention or sacrificing any advantages thereof.

I claim:

1. The method which comprises dispersing, at a temperature from 10° to 40° C., finely divided rubber hydrochloride prepared by hydrochlorination of an aqueous dispersion of natural rubber and which possesses high molecular weight, low solubility, and high chlorine content, to form an organosol in an organic liquid selected from the group consisting of aromatic hydrocarbons, monochlorinated aromatic hydrocarbons, and dioxane, said organic liquid possessing only a slight swelling effect upon the rubber hydrochloride at the dispersion temperature but exerting a stronger swelling effect leading to gelatinization of the rubber hydrochloride when the temperature is increased, the amount of rubber hydrochloride being from 5% to 40% by weight based on the total weight of the organosol, and then heating the organosol to a temperature from about 80° to about 170° C. for a period of from 2 to 10 minutes to gelatinize the dispersed rubber hydrochloride.

2. As a new article of manufacture, a thin sheet material comprising gelatinized rubber hydrochloride of high molecular weight, low solubility, and high chlorine content prepared by the method of claim 1.

3. The method of claim 1 wherein the organic compound is benzene.

4. The method of claim 1 wherein the organic compound is toluene.

5. The method of claim 1 wherein the organic compound is xylene.

6. The method of claim 1 wherein the organic compound is monochlorobenzene.

7. The method of claim 1 wherein the organic compound is dioxane.

References Cited in the file of this patent

UNITED STATES PATENTS

| | | |
|---|---|---|
| 1,989,632 | Calvert | Jan. 29, 1935 |
| 2,174,674 | Winkelmann | Oct. 3, 1939 |
| 2,201,034 | Gebauer et al. | May 14, 1940 |
| 2,211,431 | Olsen | Aug. 13, 1940 |
| 2,307,081 | Snyder | Jan. 5, 1943 |
| 2,308,186 | Lyon | Jan. 12, 1943 |
| 2,374,759 | Latour | May 1, 1945 |
| 2,423,555 | Ender | July 8, 1947 |
| 2,536,789 | Van Amerongen | Jan. 2, 1951 |

FOREIGN PATENTS

| | | |
|---|---|---|
| 500,298 | Great Britain | Feb. 7, 1939 |